United States Patent [19]

Cronyn

[11] Patent Number: 5,223,840
[45] Date of Patent: Jun. 29, 1993

[54] LOW COST RADAR TARGET SIMULATOR FOR REMOTE RADAR TESTING

[75] Inventor: Willard M. Cronyn, San Diego, Calif.

[73] Assignee: The United States of America as represented by the Secretary of the Navy, Washington, D.C.

[21] Appl. No.: 851,417

[22] Filed: Mar. 13, 1992

[51] Int. Cl.⁵ .............................................. G01S 7/40
[52] U.S. Cl. ..................... 342/170; 342/171; 342/172
[58] Field of Search ................. 342/169, 170, 171, 172

[56] References Cited

U.S. PATENT DOCUMENTS

| | | | |
|---|---|---|---|
| 3,128,462 | 4/1964 | Woolfson | 342/172 |
| 3,323,123 | 5/1967 | Hegarty et al. | 343/17.7 |
| 4,168,502 | 9/1979 | Susie | 342/172 |
| 4,450,447 | 5/1984 | Zebker et al. | 343/17.7 |
| 4,679,049 | 7/1987 | Riffiod | 342/172 |
| 4,683,473 | 7/1987 | Haugland | 342/172 |
| 4,737,792 | 4/1988 | Grone | 342/169 |
| 4,982,196 | 1/1991 | Thomas et al. | 342/172 |
| 5,047,782 | 9/1991 | Lew et al. | 342/169 |
| 5,160,264 | 11/1992 | Banura et al. | 342/169 X |

Primary Examiner—T. H. Tubbesing
Attorney, Agent, or Firm—Harvey Fendelman; Thomas Glenn Keough; Peter A. Lipovsky

[57] ABSTRACT

A moving target simulator is provided for testing a wide variety of radars without the need for a direct connection between the simulator and the radar under test. The simulator accurately replicates the pulse width and amplitude of transmitted radar signals and provides a delay feature that permits simulated target scenarios to be presented to a radar under test. The simulator incorporates control features that allow Doppler frequency changes to be accounted for and that permit signal level changes to be made as in accordance with inverse 4th law distance-dependent target-return power variation.

11 Claims, 9 Drawing Sheets

LOW COST RADAR TARGET SIMULATOR FOR REMOTE RADAR TESTING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention relates to target simulators for testing radar and, more specifically, to a low cost, moving target simulator for testing a wide variety of radars without the need for a direct hard wire connection between the simulator and the radar under test.

2. Description of the Related Art

Numerous radar systems have built-in "target simulators" or even "moving target simulators" as test or training target-track pattern generators. Many such systems are directly connected to the radar under test and are therefore incapable of providing independent testing of the entire radar system, including its antenna. The systems usually require placing the radar in a special operating mode such that the radar cannot be used in its normal target search, acquisition and tracking modes.

This special mode does not permit the radar to be simultaneously subjected to the various deleterious signals of the external environment such as either unintentional or intentional electromagnetic interference. Additionally, there is usually no provision in these simulator systems for varying target return in order to evaluate radar system minimum detectable signal or to impose realistic inverse-4th law distance-dependent target return power variation.

Many existing radar target simulators are dedicated to a particular radar system and are incompatible with other radar systems. The existing radar simulators, whether dedicated or non-dedicated, often cost in the hundreds of thousands of dollars. The enhanced cost of these simulators is largely attributable to their complex design.

For example, the so-called DRFM-based (digital radio frequency memory) simulator requires operationally complex and expensive components to enable the capture and delayed retransmission of radar pulses. These components require significant power consumption and thermal dissipation.

In a DRFM-based simulator, the radio frequency waveform i.e. the pre-detection waveform, is sampled, resulting in a large number of samples which must be acquired at very high speed over the duration of a received radar pulse. The sampled waveform is stored in high speed memory, recalled with an appropriate delay, and is then retransmitted.

For example, a radar pulse width of 0.25 $\mu$sec requires an RF bandwidth of more than 4 MegaHertz which then requires a DRFM sampling rate of more than 10 MegaHertz. For a typical pulse Doppler radar with a 20 to 1 variation in pulse width, the total number of samples which must be taken in a maximum 5 $\mu$sec pulse width will be in excess of 50. Unless the DRFM time-tags each pulse, which increases complexity, it must continuously take samples that are later "played-back" with a delay appropriate for the distance of the simulated target. To simulate a target distance of eighty miles, there must be a delay of 1 millisecond. For such a delay, over 10,000 samples would need to be taken at the sampling rate of 10 MegaHertz.

An ideal target simulator should be versatile enough to accommodate the wide variety of radars currently in service as well as those planned for service in the near future. The radar target simulator should be useable for radar testing, training, logistics, security, and maintenance reasons. The simulator should also be useable remotely as well as directly with a radar system under test. Such a simulator must replicate (and retransmit), in both time and amplitude variation, and with an appropriate delay, an incoming pulse stream from a radar under test.

As the amplitude of the pulses received by a simulator will vary as an azimuthally scanning radar antenna beam sweeps across the simulator's antenna, it is important that the simulator's output track this amplitude variation. Ideally, the target simulator should also be able to create a variety of target trajectories, e.g. constant velocity, a continuous cycling between specified minimum and maximum distances, the ramping up and down in velocity of a target, etc., as well as being able to simulate variable target power such as constant or inverse-4th power of distance. While meeting the above, such a device should be as simple as possible as well as inexpensive.

SUMMARY OF THE INVENTION

The invention provides a moving target simulator that is simple in operation and that is of a relatively low cost. This simulator is suitable for use with a large variety of radar systems and has no requirement to be hard wired to a radar system under test though such a direct connection is possible. The moving target simulator of the invention permits a radar system to be fully tested; that is, a radar system may be engaged in its normal operating mode and the entire radar system, including the radar antenna, may be tested.

In the system of the invention, a radar pulse from a radar under test is first received on a receive antenna. Rather than using prior art complex sampling techniques, the moving target simulator of the invention utilizes a computer controlled spectrum analyzer as a tuner for the received radar signal. The spectrum analyzer is used to filter and amplify the received signal for further system processing.

From time-to-time, as specified by the moving target simulator system programmer, the spectrum analyzer is also used to measure the frequency of the received radar signals. How often this is done depends upon the relative frequency stability of the instrumentation used in the invention as well as that used in the radar, and the requirements imposed by the radar on the precision of the radar target frequency.

The spectrum analyzer, when operating in the first described fixed-tuned receiver "front-end" mode, down-converts the frequency of the received radar signals to an intermediate frequency (I.F.). This I.F. output of the spectrum analyzer is detected by a LOG I.F. amplifier.

Optionally, instead of using the LOG I.F. amplifier to detect the incident radar signal, the internal detector of the spectrum analyzer itself can be used. This internal logarithmic detector provides a video output.

For the specific operational implementation of the invention to be described, the video output could not be used for all measurements because the spectrum analyzer's circuitry intrinsically limited it to handling pulse widths of approximately 1 μsecond or longer, whereas the I.F. output-LOG I.F. combination could be used for received pulse widths as short as 0.1 μsecond or less.

The I.F. combination or video output is then inserted into what is designated here as the moving target simulator module.

Within this module the amplitude of the input signal from the spectrum analyzer is measured digitally, that is, it is converted into a binary encoded number. This A/D digital number is used to: (i) directly control the attenuation of an output signal from the moving target simulator system (the attenuation is controlled so that the output signal level from the simulator system directly tracks radar signals received from a radar system under test); (ii) to provide an operator with a visual indication that the radar and the moving target simulator of the invention are operating; and (iii) to provide a threshold value for the next pulse received from a radar under test.

The threshold value is of an absolute or relative nature. This threshold value is used as a reference for evaluating both the width and the time-of-arrival of a radar pulse received by the moving target simulator.

The threshold value serves a multitude of purposes: (a) when the threshold is crossed at the leading edge of a received pulse, a first digital delay generator is triggered to generate a pulse. When the trailing edge of the received radar pulse crosses the specified threshold a second digital delay generator is triggered. An overlap of the digital delay generator's pulses indicates the width of the received radar pulse so that this width may be accurately replicated for radar testing purposes. The threshold is also used in another sense.

In the invention the LOG I.F. combination input or the video input, both of which are provided through the spectrum analyzer, are converted from an analog to a digital state in an analog-to-digital converter. Besides providing this conversion capability, the analog-to-digital converter also records the peak amplitude reading of a received radar pulse. This amplitude reading, among other things, permits accurate replication of variations in radar pulse amplitudes such as occurs as a rotating radar antenna "sweeps" a target.

When the trailing edge of the received pulse crosses the set aforementioned threshold value, the peak pulse amplitude captured by the analog-to-digital converter is read out and the converter is reset so as to enable the measurement of the peak amplitude of the next received radar pulse. Additionally, when the trailing edge of a received radar pulse crosses this threshold it initiates the resetting of the threshold value itself so that for a following received radar pulse either an absolute or relative threshold value will be used according to operator entered input.

The absolute minimum threshold is a threshold specified by an operator to be a cutoff for the lowest amplitude radar pulses desired to be used in the invention. This prevents the simulator from attempting to respond to background noise.

The relative threshold is defined as follows: The amplitude of a first receive pulse $P_1$ minus an off-set (e.g. 3 dB) is used as a threshold for a second received pulse. The amplitude peak for the second pulse is measured and from this the off-set is subtracted and used as a threshold for the third pulse, etc. If, however, the level of the relative threshold ever falls below the absolute minimum then the threshold utilized for the next received radar pulse will be the absolute minimum threshold value, not the relative threshold value.

After a received pulse crosses the threshold value, the moving target simulator module of the invention employs a logic operation to select a future threshold. In this logic operation, if the relative threshold (calculated by taking the peak pulse amplitude and subtracting the operator entered offset) is less than the minimum threshold, or if this subtraction process has resulted in a "carry" set (negative value for relative threshold), or if the threshold has been reset by the system operator, the threshold value used for the next radar pulse will be the minimum threshold value. If none of these conditions apply, the relative threshold value is used as the threshold for the next pulse.

The utilized (digital) threshold value is then converted to an analog voltage threshold. When the input signal to the moving target simulator module (from either the Log I.F. amplifier or the video signal directly from the spectrum analyzer) exceeds the threshold, a new pulse capture sequence is initiated. When the input signal drops below the threshold, the new peak pulse amplitude is read out of the analog-to-digital converter and the converter is reset. This also causes the digital form of the threshold to be written into the invention's digital-to-analog converter for use in future pulse comparison.

Also, when the input signal from the invention's spectrum analyzer is greater than the utilized threshold, the pulse width of a received radar pulse is measured through the triggering of the digital delay generators.

Once the amplitudes and the pulse widths of received radar pulses are measured, they can be delayed or otherwise altered so as to be useable for simulator testing.

OBJECTS OF THE INVENTION

It is an object of this invention to provide an improved radar target simulator.

Another object of this invention is to provide an improved radar target simulator that is usable with a great variety of radars.

Yet a further object of this invention is to provide an improved radar target simulator that can be used remotely from a radar under test so that complete radar testing is possible.

Yet another object of this invention is to provide an improved radar target simulator that is low in cost and simple in design.

Other objects, advantages and new features of the invention will become apparent from the following detailed description of the invention when considered in conjunction with the accompanied drawings.

DESCRIPTION OF THE PREFERRED EMBODIMENT

Figure 1:
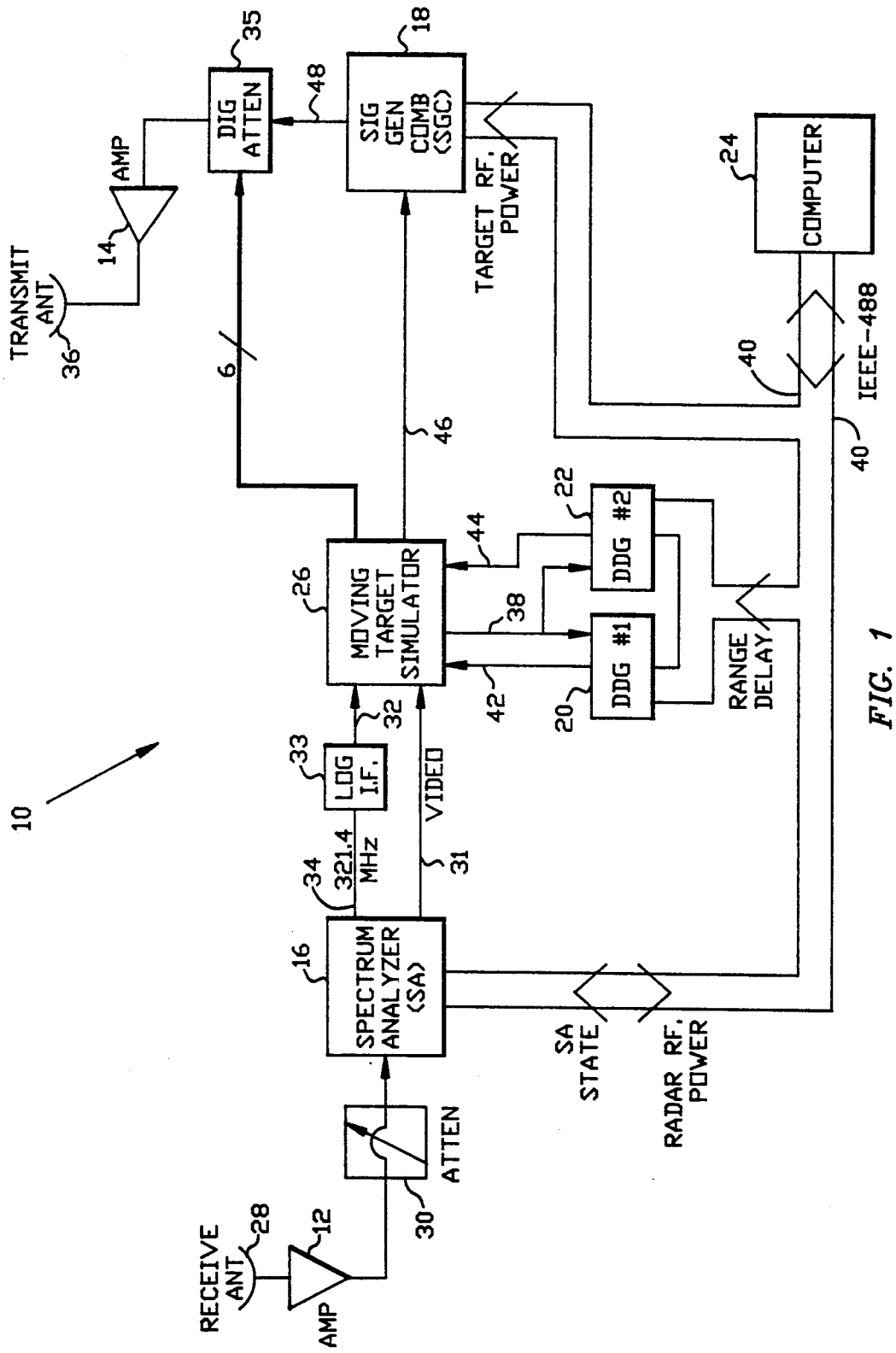
FIG. 1 is a block diagram representation of a moving target simulator system 10 according to the invention.

In FIG. 1 an over-all moving target simulator system 10 incorporating the invention is shown. Within this system there are several commercially-available instruments: optional amplifiers 12 and 14, a spectrum analyzer (SA) 16, a signal generator combiner (SGC) 18, digital delay generators (DDG) 20 and 22 and a software implemented computer 24 through which operator commands may be entered. The heart of the invention lies within moving target simulator module (MTS) 26.

Figure 2:
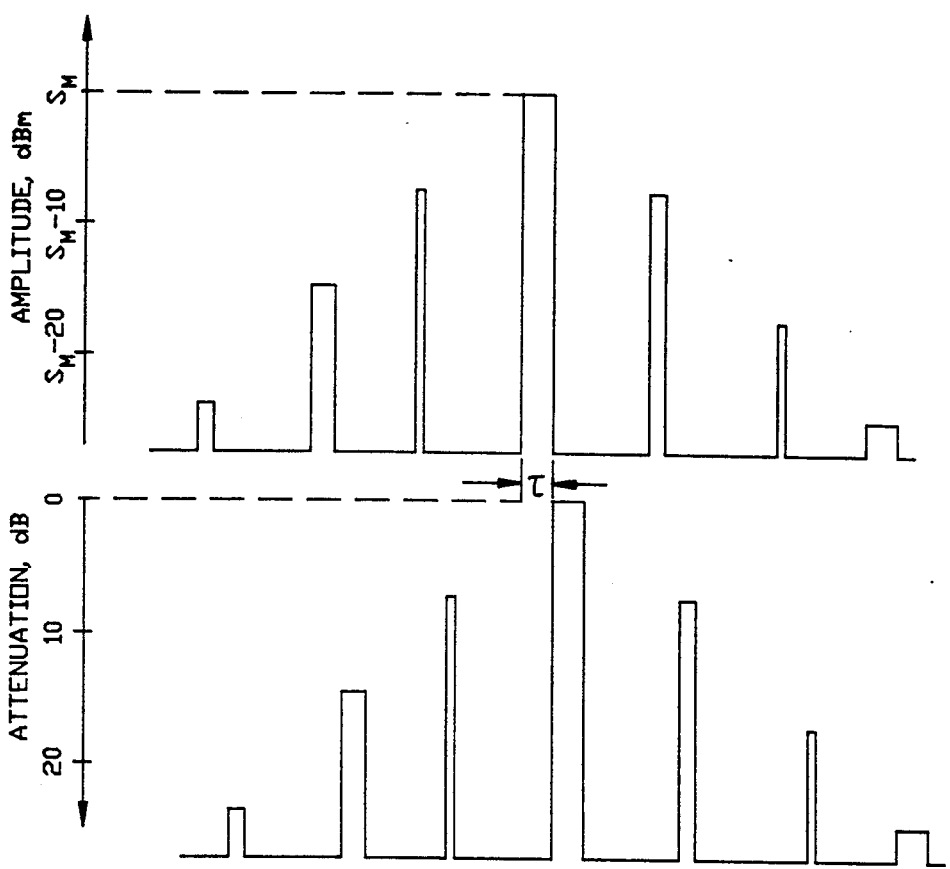
FIG. 2 illustrates pulse width and amplitude variation replication with delay as made possible by the invention described herein.

In FIG. 2 the pulse width and amplitude replication-with-delay functions of MTS module 26 are illustrated. In the top portion of this figure pulse amplitude variation with time, as occurs as a radar beam sweeps across a receive antenna, is shown. In the bottom portion of this figure retransmitted pulses such as those made possible by the moving target simulator of the invention are shown. Delay time $\tau$ is determined by target range and is output to digital delay generators to be discussed.

A general description of system 10 will be given first followed by a more detailed description. Referring again to FIG. 1, in operation, a radar signal from a radar under test is first received on receive antenna 28, it is optionally amplified by fixed-gain amplifier 12 and/or attenuated by attenuator 30 and is then input into conventional spectrum analyzer 16. The spectrum analyzer is periodically used to take power and frequency measurements of the incoming received radar signal in addition to serving as a fixed-tuned receiver of moving target simulator system 10.

The input signal to MTS 26 may be obtained either directly from spectrum analyzer 16's video output 31 or from the output 32 of a LOG Intermediate Frequency (IF) amplifier 33 connected to an I.F. output 34 of spectrum analyzer 16. In either case, the signal input to MTS 26 is proportional to the logarithm of the received radar signal's power.

The choice of input source for the MTS is determined by the pulse width of the received radar signals, interference, and by the signal-to-noise ratio. With high signal-to-noise ratios or fast radar pulses (as short as approximately 0.1 $\mu$second) the fast response time of the LOG I.F. output 32 is required. In the presence of interference or long pulses (approximately 1 $\mu$second or above), the input video signal 31 is most appropriate for use with moving target simulator element 26.

Within MTS 26, the peak input signal level of each received radar pulse is sampled and is used to set the attenuation of digital attenuator (DIG-A) 35. Digital attenuator 35 adjusts the output of system 10 so that this attenuation, in decibels, is proportional to the received radar pulse's signal level as input into MTS 26. Thus, the amplitude of each pulse re-radiated to a radar under test through transmit antenna 36 is proportional to variations in the amplitude in each radar pulse received by receive antenna 28. This ensures the capturing or replicating of accurate amplitude variations for realistic simulation testing.

Also within MTS 26 an analog comparator is used to generate a pulse 38 whose width is essentially the duration of the received input signal above a threshold level set within MTS 26. This comparator pulse is output to two digital delay generators (DDG) numbers 1 and 2, these being shown as elements 20 and 22, respectively. Digital delay generators 20 and 22 are programmable delayed one-shots for which the programmed delay (identical for both DDGs) of a simulated radar return echo is computer-controlled over a data bus 40 (GPIB or IEEE488).

Each digital delay generator is configured to generate identical duration pulses the overlap of which indicates the pulse width of a received radar pulse. The duration of the digital delay generator pulses must be slightly longer than the longest pulse generated by the radar under test. Digital generator number one (element 20) is configured to generate positive pulses and has a delay referenced to the leading edge of comparator pulse 38. Digital delay generator number two (element 22) is configured to generate negative pulses with its delay referenced to the trailing edge of comparator pulse 38.

The positive/negative pulse pair from the digital delay generators, these pulses being shown on lines 42 and 44, respectively, is then set back into what is a NAND gate operation in MTS 26, an output 46 of which is used to pulse signal generator combiner 18.

Figure 3:
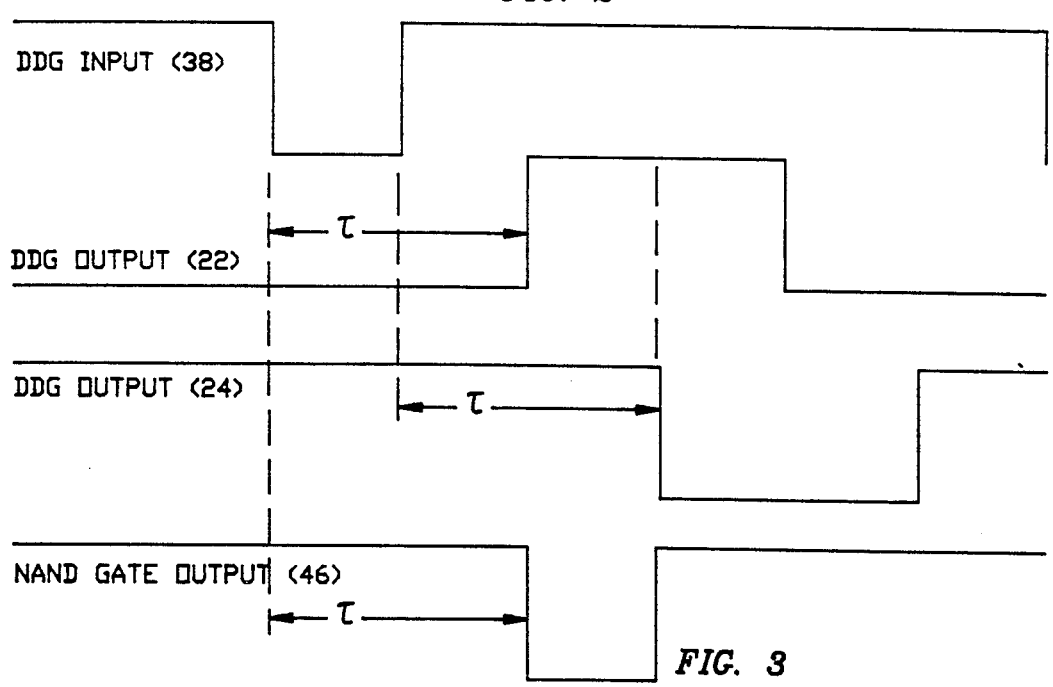
In FIG. 3, there is illustrated how the pulse width of a received radar pulse is replicated in the invention.

These pulses are illustrated in FIG. 3 in which programmed delay ($\tau$) is entered by way of computer 24.

There are no stringent requirements on the digital delay generator pulse length, although the more the digital delay generator pulsing extends into the interpulse interval, the less the maximum pulse delay becomes. This is because the trailing edge of the simulated delayed pulse must not overlap the leading edge of the next pulse received from the radar under test.

The simulated target range delay may be changed and output to the digital delay generators (each with the same GPIB address so that the delays are updated simultaneously) in a timed loop within the moving target simulator system's software in accordance with a desired range-versus-time profile of the simulated target.

Referring now to greater details of the moving target simulator system of the invention, reference is made once again to FIG. 1. The spectrum analyzer 16, preamplifier 12/attenuator 30 combination will now be discussed.

The amplifier/attenuator combination (elements 12 and 30) is used to set the peak signal level at the input to the LOG I.F. amplifier 33 such that the attenuation provided by digital attenuator 35 is zero dB when input 34 is at a set peak level. The external gain/attenuation combination of amplifier 12 and attenuator 30 is used only when the LOG I.F. 3 output is utilized as there is no other mechanism for adjusting the peak signal level at the input to moving target simulator element 26.

If spectrum analyzer 16's video signal 31 is used no external gain control is necessary, as the spectrum analyzer has gain controls permitting the peak signal level into MTS 26 to be adjusted.

The programmed threshold level, that which moving target simulator system 10 utilizes to measure the timing and pulse width of a received radar pulse, will now be described.

The threshold level used is the greater of two possible thresholds: (1) the amplitude level of a previously received radar pulse minus a fixed margin/off-set, such as 3 dB; (this is referred to herein as a relative threshold as it is a threshold level relative to a previously received radar pulse); and (2) a fixed (absolute) threshold level below which the moving target simulator of the invention is designed not to respond to (signals below, this threshold could simply be noise or low level side lobes irrelevant to the operation of both the moving target simulator and the radar under test).

Signal generator combiner 18 of system 10 will now be discussed. In FIG. 1 there is shown a single block for signal generator combiner 18. In a preferred embodiment of the invention, signal generator combiner 18 includes a conventional signal generator combined with a direct digital synthesizer or DDS the signals of which are combined in a mixer. Output 48 of signal generator combiner 18 is a signal whose frequency is the original incoming radar frequency (as measured by spectrum analyzer 16) plus any desired Doppler off-set.

In a typical application, the signal generator combiner output frequency is fixed. The frequency of the direct digital synthesizer within signal generator combiner 18 is set through computer 24 over bus 40 to be the difference between the desired simulated output frequency and the frequency of the signal generator within combiner 48.

For example, for an X-band signal of 8.5 GigaHertz, the signal generator might be set to 8.4 GigaHertz and the direct digital synthesizer to 100 MegaHertz. The advantage of using a direct digital synthesizer is that returning is far faster, with far higher resolution, than as with a single signal generator.

If it is desired to impose precalculated, relatively slow variations in the output signal level of the moving target simulator system, these can be imposed through commands from computer 24 to the signal generator combiner 18 over bus 40. An example of such a variation is the inverse-4th law dependence of radar signal level on range.

It should be noted that for the particular digital delay generators used in the embodiment here described, it was found that within approximately 160 $\mu$seconds following initiation of a delay up-date command over bus 40, the NANDed combination of the DDG pulses resulted in pulses whose duration was that of the digital delay generator pulses rather than that of the received radar signal. For those radars tested, it was found that multiple long duration pulses had a deleterious effect on radar system performance. However, if only one such long duration pulse was radiated during an up-date window, and pulse radiation was inhibited during the remaining of the window, no deleterious effects were noted.

Such considerations are important only if the radar pulse repetition time (PRT) is less than 160 $\mu$seconds. To avoid this problem, timing circuitry is disclosed that senses long duration pulses and inhibits further moving target simulator pulsing during the up-date window.

Figure 4:
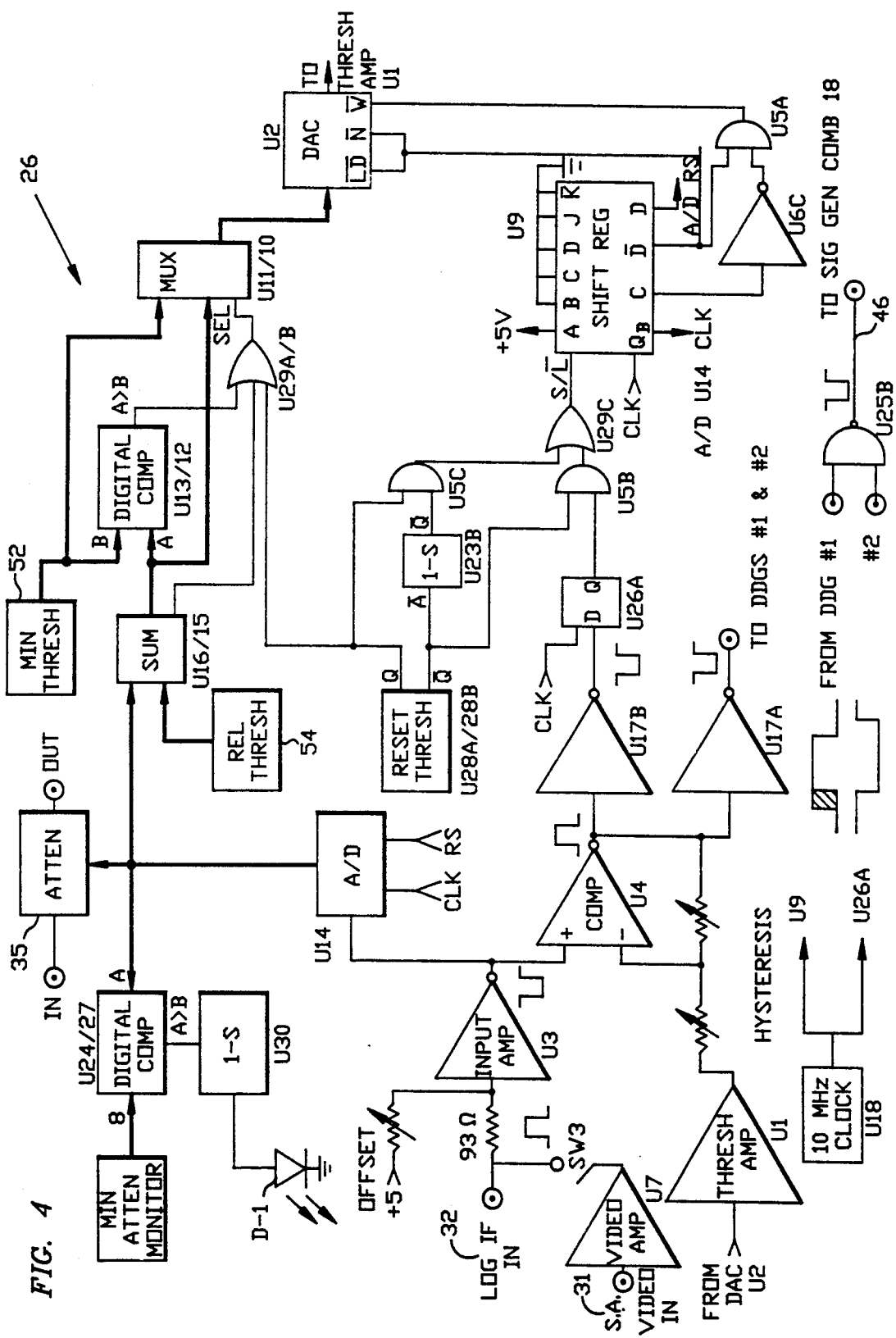
In FIG. 4 a detailed block diagram of the moving target simulator module 26 of the invention is shown.

Referring now to FIG. 4 a detail of the moving target simulator element 26 of FIG. 1 is shown. As shown, signal input to moving target simulator 26 is from either output 32 of LOG I.F. amplifier 33 or is from video output 31 of spectrum analyzer 16 as provided through switch SW3, LOG I.F. amplifier 33 and spectrum analyzer 16 being shown in FIG. 1. The 93 $\Omega$ resistor provides the needed (93 106 ) termination for the LOG I.F. 32 signal. High input impedance video amplifier U7 establishes the proper gain for spectrum analyzer 16's video signal 31. The gain of inverting input amplifier U3 is approximately $-32$ mV/dB for both the LOG I.F. signal and the spectrum analyzer video signal (with a spectrum analyzer vertical scale response of 10 dB/division). The sensitivity of peak A/D converter U14 is then one LSb=0.25 dB (LSb=Least Significant bit). Thus, the dynamic range of 8-bits A/D U14 is 255*0.25=63.75 dB. The off-set resistor is adjusted to set the operating point of A/D U14 such that if the input signal level to spectrum analyzer 16 is approximately $-20$ dBm, and there is no internal spectrum analyzer input attenuation, the digitized signal level is binary 0000 0000, and there is no radio frequency (RF) attenuation in attenuator 35. Similarly, gains and off-sets are set so that if the input to MTS 26 is the spectrum analyzer 16's video signal 31, and the peak pulse amplitude of a received radar signal is at the spectrum analyzer reference level, the RF attenuation word is 0000 0000. It should be noted that attenuator 35 in the embodiment used has a 6-bit input, and since the LSb on the attenuator is 1 dB, only the highest order binary digits are actually used to set the attenuation of this attenuator.

The output of input amplifier U3 also appears as an input to inverting comparator U4, the output of which is a positive-going transistor-transistor-logic (TTL) transition when the (negative-going) leading edge of the received radar pulse crosses the threshold level of the inverting input to comparator U4 and a negative-going (TTL) transition when the (positive-going) trailing edge of the received radar pulse recrosses the threshold level. Positive feedback around comparator U4 is used for 4 bits of digitally controlled hysteresis to be set according to the signal-to-noise ratio so as to eliminate chattering; one LSb=0.5 dB hysteresis. This scaling is trimmed using a variable resistor R12.

Inverted AND gate U17A inverts U4's TTL comparator output pulse and drives digital delay generators 20 and 22 (FIG. 1) through a daisy chain feed. Digital delay generator number one (element 20) is configured for high input impedance, negative-going triggering (i.e., leading edge triggering), while digital delay generator number two (element 22) is configured for 50 $\Omega$ input impedance, positive-going triggering (50 $\Omega$ input impedance to eliminate reflection). Digital delay generator number one (20) is configured for outputting a positive TTL pulse while digital delay generator number two (22) is configured for a negative pulse; both digital delay generators are configured for pulse widths slightly longer than the longest pulse to be transmitted from the radar under test. The outputs of the two digital delay generators are input to the U25B NAND gate shown at the bottom of FIG. 4, the output of which is a negative TTL pulse which is used to pulse signal generator combiner 18.

The remainder of the MTS circuitry shown effectuates timing of the read-out of A/D U14 converter and establishes the threshold level at comparator U4. The leading and trailing edge transitions of the inverted pulse out of inverted AND gate U17B are synchronized with the 10 MHz MTS clock at the D FF (flip-flop), U26A. Unless comparator U4's threshold is being manually reset, the low-state output of U26A loads shift register U9 with a bit pattern of 1000. Thus, one clock pulse after the trailing edge of comparator U4's replica of the received radar pulse, the shift register U9's pattern will be 0100 (the leading bit will be clocked ahead, and the J/$\overline{K}$=0/0 state will result in a serial bitstream of 0's to be clocked into shift register U9) and A/D U14's peak signal level will be clocked out because its clock line is pulsed high by the U9's $Q_B$ line. Two clock pulses after the trailing edge of the received radar pulse the shift register U9 state will be 0010 and the $\overline{W}$ line of digital-to-analog converter U2 will be pulsed low until clock pulse 5, enabling a write to digital-to-analog converter U2. Three clock pulses after the trailing edge of the radar pulse, digital-to-analog converter U2 will load the state of MUX output U11/10 (convention being Least/Most Significant), and output the corresponding value to the threshold amplifier U1 all in accordance with the timing requirements of the digital-to-analog converter U2.

The digitized value of the peak pulse amplitude is output to RF attenuator 35, digital comparator U24/27 and digital summer, U16/15. Referring back to FIG. 1, the gain of MTS 26 is such that for every one dB increase in signal level at its input the attenuation decreases by one dB. Offsets are adjusted so that if LOG IF amplifier 33 is used, an input to spectrum analyzer 16 of approximately −20 dBm, with no internal spectrum analyzer attenuation, will result in a 0 dB MTS attenuation. If the input is spectrum analyzer 16's video, the MTS attenuation will be 0 dB if the peak signal displayed on spectrum analyzer 16 is equal to the spectrum analyzer reference level (the signal level on the uppermost abscissa scale).

Referring once again to FIG. 4, digital comparator U24/27, 1-shot U30 and light emitting diode (LED) circuitry D-1 are used to provide continuous visual monitoring of when minimum attenuation from attenuator 35 occurs. As previously discussed, a high level input signal will result in a low attenuation at the moving target simulator's output so that a minimum attenuation indication means that peak radar signal levels are being processed, serving as an end-to-end check of the over-all system operation.

A desired attenuation threshold value is entered by a system operator as a digital word. When digital comparator U24/27 senses that the attenuation word output to attenuator 35 is equal to, or greater than, the value of the user-entered threshold, the A>B output line of digital comparator U24/27 is set high, triggering 1-shot U30 and turning on D-1. The 1-shot functions as a pulse stretcher: the A>B line may be high for only a few microseconds but LED D-1 is turned on for approximately 0.2 seconds--long enough for the user to observe.

Summer U16/15 computes the sum of the current attenuation word (8-bit output of A/D U14, of which 6-bits are input to attenuator 35) and a relative off-set value 54 entered by the system user. The purpose of this sum is to establish an analog threshold level for the next pulse passed through digital-to-analog converter U2.

For example, if the attenuation corresponding to the current pulse is 15.75 dB and the user has entered a relative off-set word of 0A Hex=10 decimal=10*0.25=2.5 dB, the threshold level for the next pulse will be set 2.5 dB below the threshold corresponding to the current pulse or an analog value corresponding to an attenuation of 18.25 dB.

However, there must be a limit set on how long the incoming pulse level will continue to trigger the moving target simulator. This limit is set by the value of the minimum threshold word 52 entered by the system user. Digital comparator U13/12 determines whether or not minimum threshold word value 52 is less than that of the summed word from summer U16/15. If it is, the logic is such that minimum threshold word 52 is selected as the input to digital-to-analog converter U2. Two other conditions which will also result in selection of minimum threshold word 52 as the input to digital-to-analog converter U2 are: (1) if summer U16/15 generates a carry, and (2) if the threshold level is manually reset by a system user.

Figure 5A:
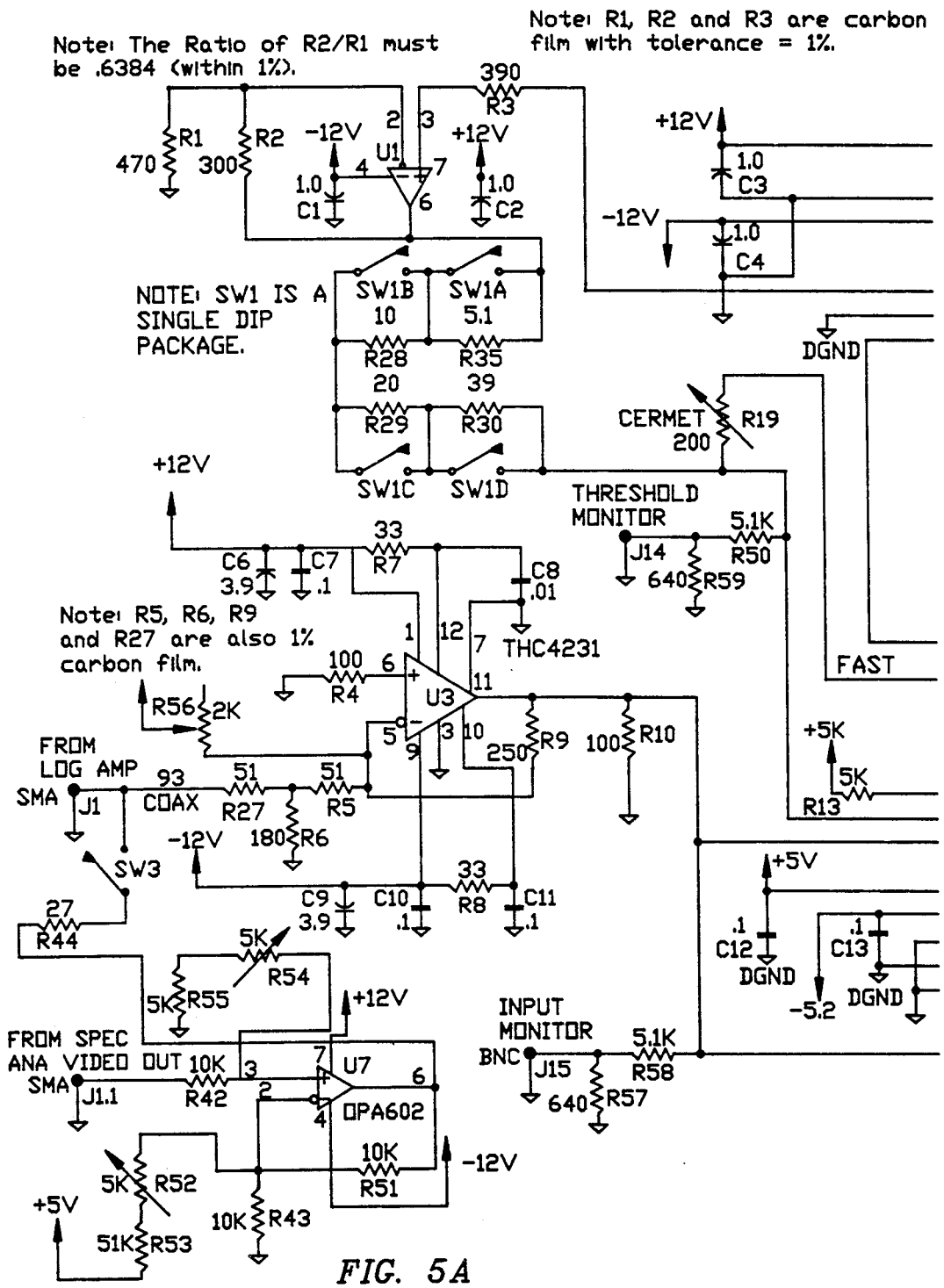
In FIGS. 5A and 5B a first portion of a detailed schematic of the moving target simulator module of FIG. 4 is shown.
Figure 5B:
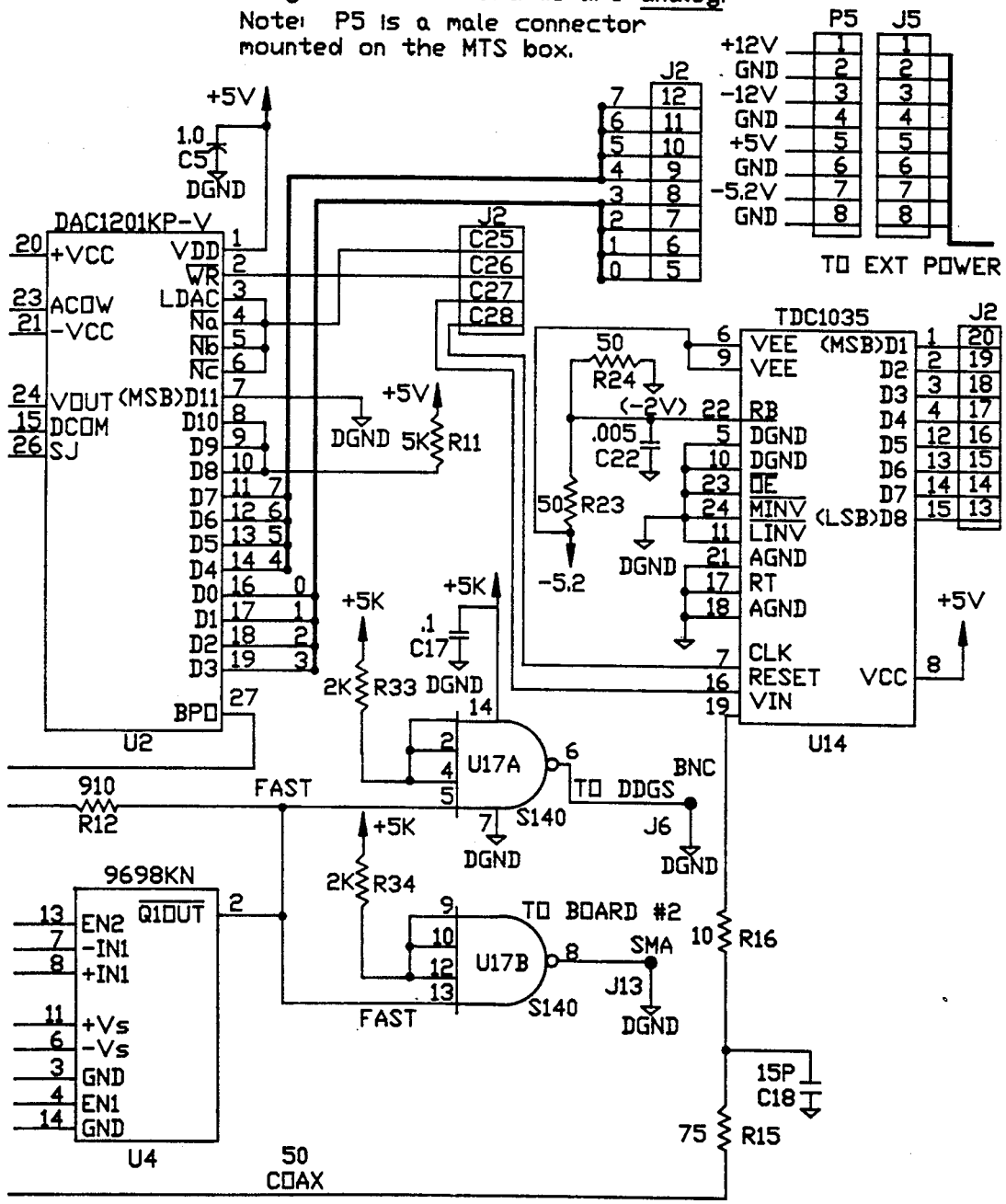
Figure 6A:
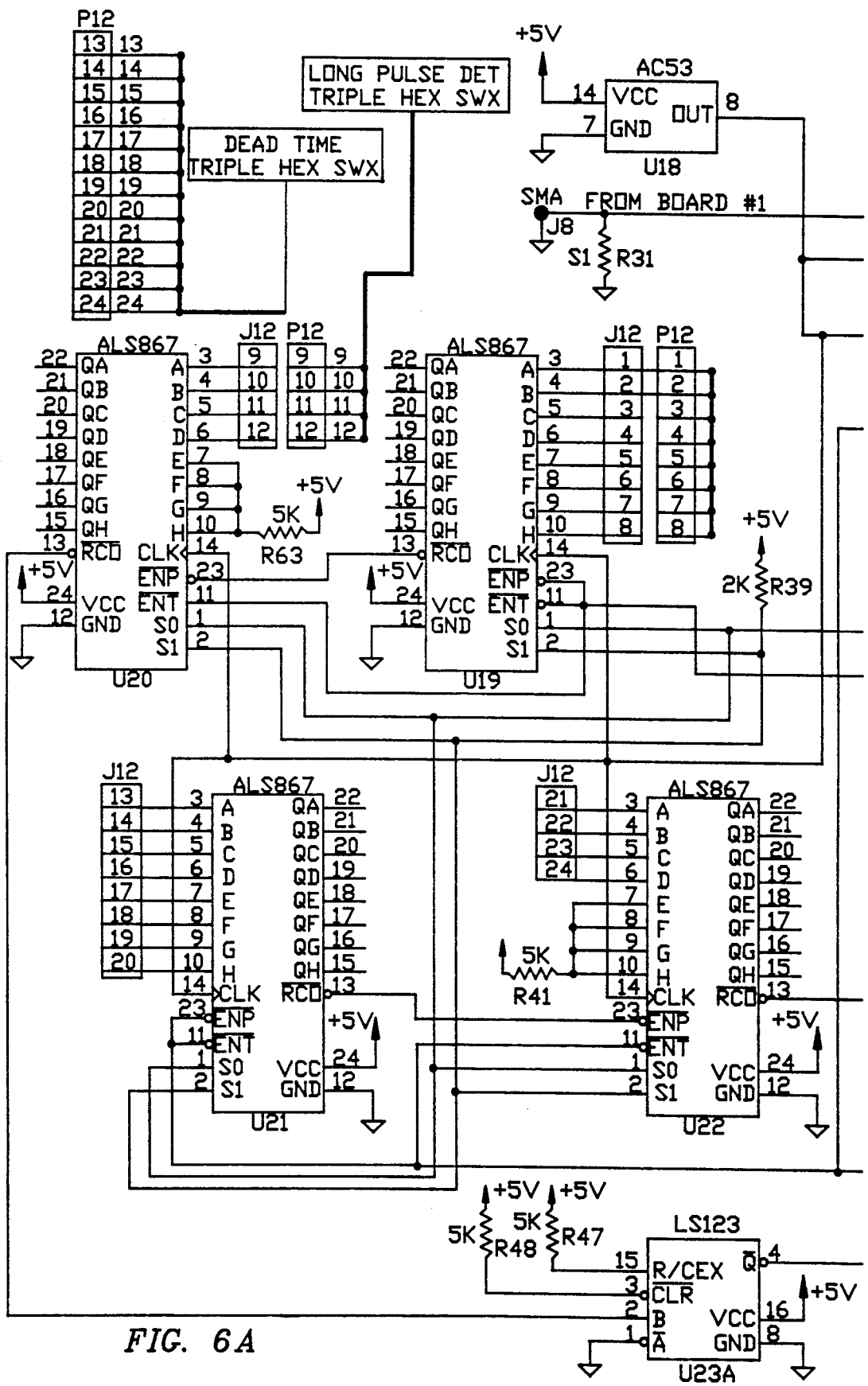
In FIGS. 6A through 6D a detailed schematic of a second portion of the moving target simulator module of FIG. 4 is shown.
Figure 6B:
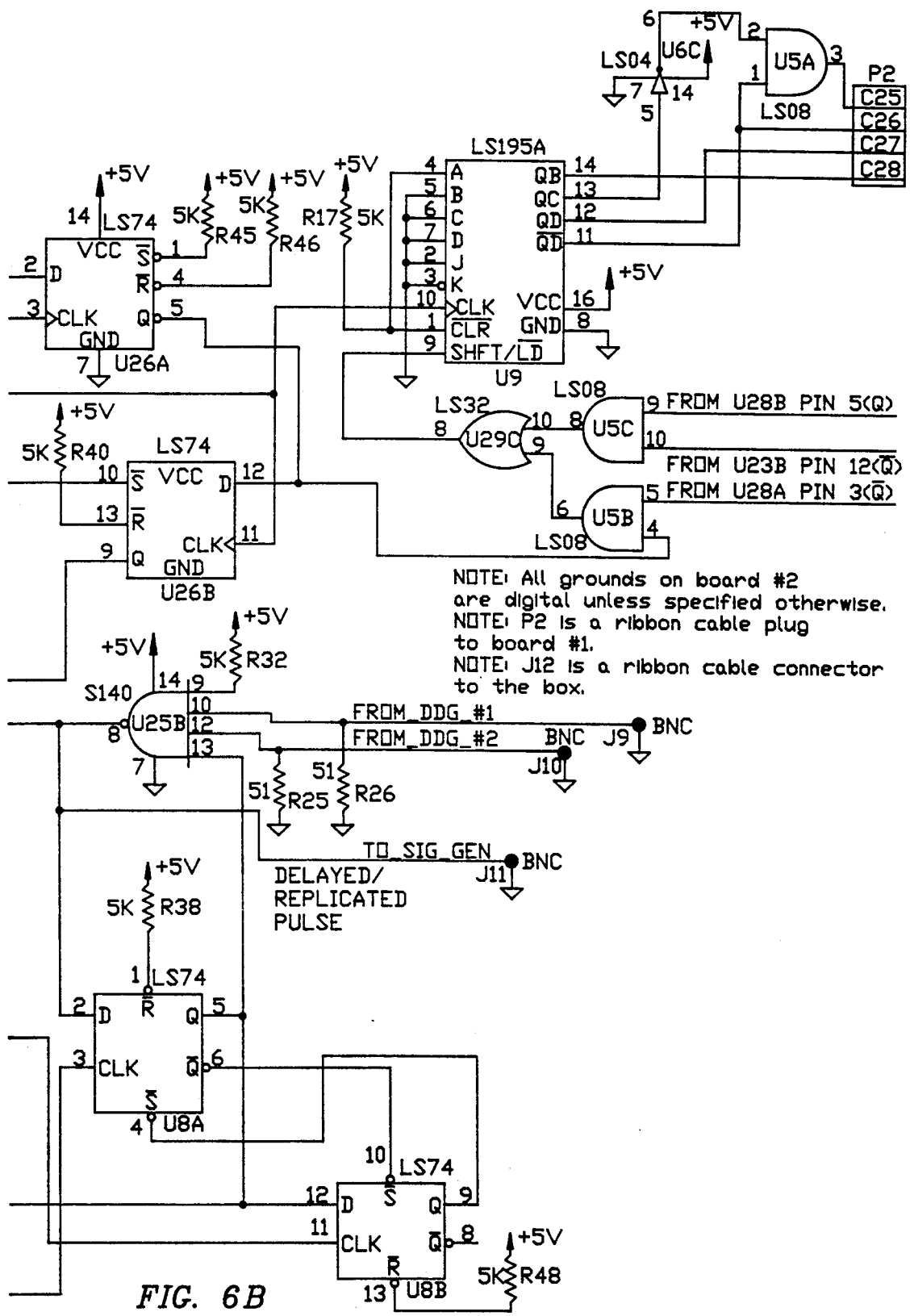
Figure 6C:
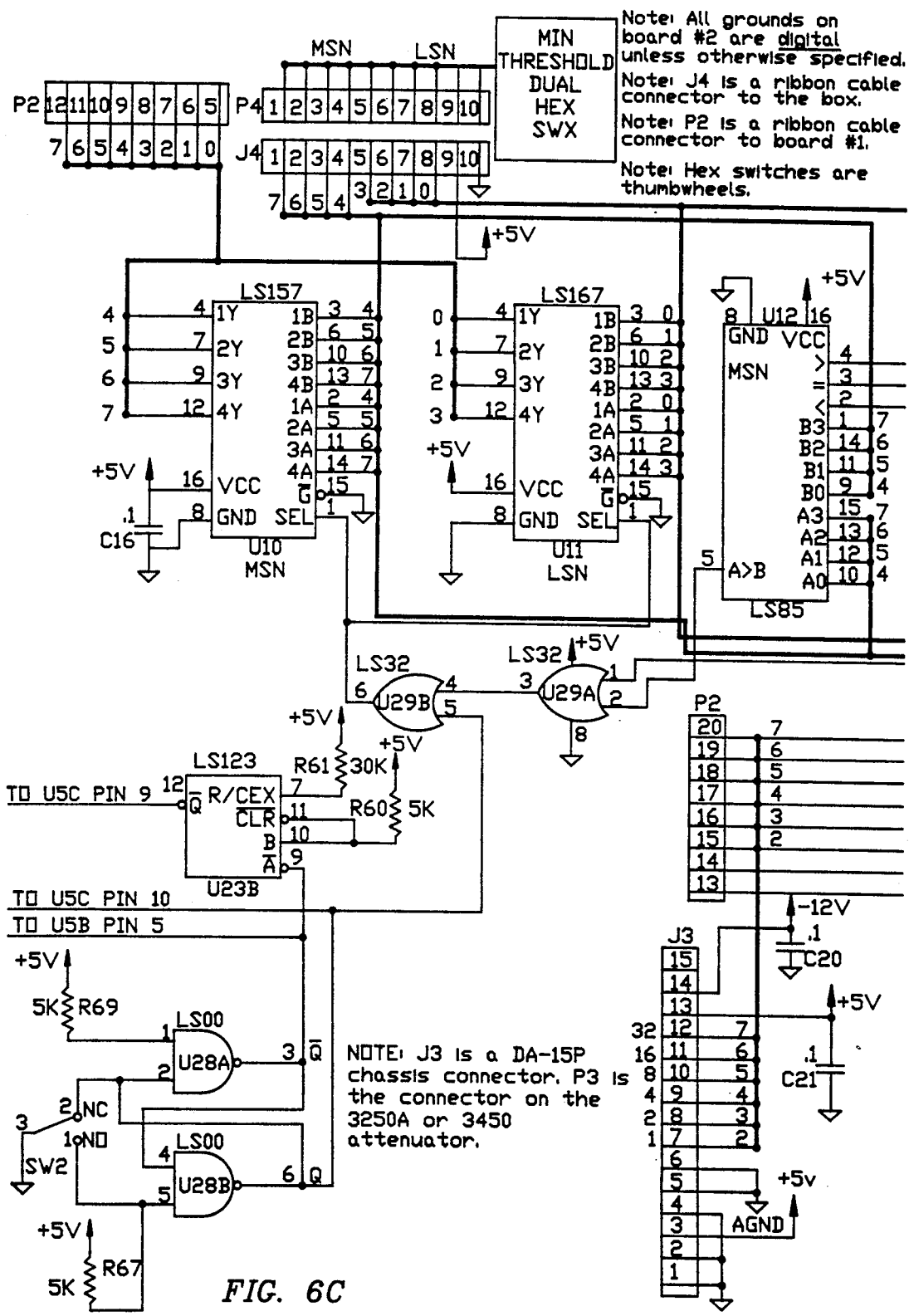
Figure 6D:
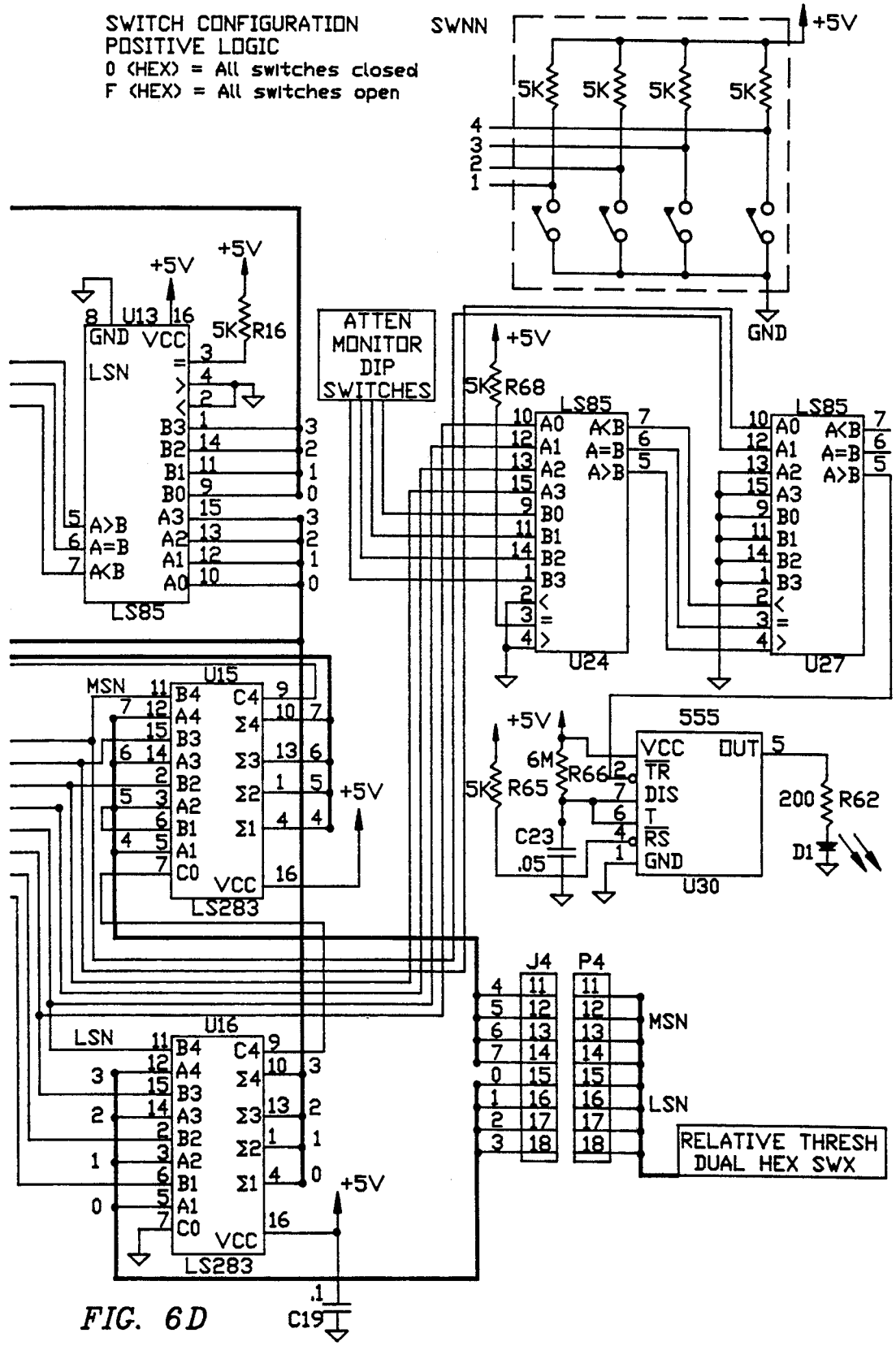

Referring now to FIGS. 5A and 5B, further details of the moving target simulator of the invention will be described. In these figures resistor network R27/R6/R5 and feedback resistor R9 provide a matched 93 Ω load for the LOG I.F. amplifier and an over-all response at the output of input amplifier U3 of a negative 32 mV/dB relative to the input to the spectrum analyzer 16 shown in FIG. 1. The off-set resistor, R56, is adjusted so that with an input signal of approximately −20 dBm, the input to A/D U14 will be VB, the negative reference voltage, resulting in an A/D digitized value of 0000 0000 binary. Similarly, the input resistor network R42/R54/R55, off-set resistors R52/R53, output resistor R44 and feedback resistors R43/R51 are selected to give a response of −32 mVdB at the output of input amplifier U3 for a spectrum analyzer scale of 10 dB/division, and an input to analog-to-digital converter U14 of VB when spectrum analyzer 16's signal is equal in amplitude to the spectrum analyzer reference level, resulting in an A/D digitized value of 0000 0000 binary. Switch SW3 is open if the input is to be from LOG I.F., and closed if from the spectrum analyzer's video output. Capacitors C6–11 and resistors R4, R7–10 are all as recommended by the vendor for input amplifier U3, in this case a TRW THC 4231. Resistors R57 and R58 are selected to give a 10:1 voltage division from the comparator input to the monitor input point J15.

Resistors R12/R19 and R35/R28-30 are for hysteresis in comparator U4's threshold to prevent noise-induced threshold re-crossings. Resistor R19 allows hysteresis calibration as one LSb (of the digitally switched network R35/R28-30)=0.5 dB (or 16 mV since the output of input amplifier U3 is 32 mV/dB). Resistor combination R50/R59 are a 10:1 voltage divider for monitoring the threshold level at comparator U4. Resistor R13 is a pull-up resistor to disable the unused section 2 of the utilized comparator U4. Capacitors C12-13 are by-pass capacitors. Inverting AND gates U17A/B are inverting 15 Ω line drivers, such as 4-input NAND gates used for the inverted output of comparator U4. Resistors R33-34 are pull-up resistors. Inverse AND gate U17A drives the coax line to the digital delay generators (DDG) shown in FIGS. 1 and 4. Inverted AND gate U17B drives a board-to-board coax. Capacitor C17 is a by-pass capacitor.

The analog A/D U14 input network of R15-16/C18 is as recommended by the vendor, TRW, for this TDC 1035 converter chip. Resistors R23/24 serve as a voltage divider network to establish the VB reference voltage for analog-to-digital converter U14, with capacitor C22 being a by-pass capacitor for this network. The CLK line clocks the digital value of the peak input voltage to the U14 output, D1-8, while RESET resets the peak value. These digital output lines are always enabled through the grounding of $\overline{OE}$, and tying $\overline{MINV}$/LINV configures the A/D output as inverted binary, for which an input voltage=VB (approximately −2.032 volts) is digitized as 0000 0000 binary, input=0 volts is 1111 1111 binary, and the 1 LSb step=8 mV (0.25 dB).

Digital-to-analog converter U2 is used to establish comparator U4's threshold. Converter U2 is configured for BOB (Bipolar Off-set Binary) digital input coding=0111 XXX XXXX wherein the X's indicate the binary digits' output by multiplexers U11/10 shown in FIG. 4.

The feedback network R1/R2 for op amp U1 establishes the gain at the comparator U4 threshold as 8 mV=1 LSb. For XXXX XXXX=1111 1111, the threshold is −8 mV. For XXX XXXX=0000 0000, the threshold VB approximately= −2.048 volts. Capacitors C1–4 are by-pass capacitors.

Further details of the implementation of moving target simulator element 26 of FIG. 1 are shown in FIGS. 6A–6D. In these figures U28A/B is a conventional debounced switch to reset comparator U4's threshold to the value specified by the user entered minimum threshold word 52 of FIG. 4. Resistors R67/R69 are pull-up resistors. The normally low-output sets D Flip-flop U26A in control of the shift register SHFT/$\overline{\text{LD}}$ line of U9. When the system user resets the comparator threshold, control of the SHFT/$\overline{\text{LD}}$ line is switched to AND gate U5C and the multiplexer U11/10 selects the minimum threshold for output. The approximately 610 nanosecond negative pulse out of 1-shot U23B asserts the $\overline{\text{LD}}$ function for shift register U9.

The 0.2-second on-time of LED D1 is determined by the 1-shot U30 network R66/C23. Resistor R65 is a pull-up resistor to configure U30 as a 1-shot.

The moving target simulator of the invention makes it possible to generate a realistic simulated target return signal by replicating three parameters of a received radar signal: (1) pulse width, (2) inter-pulse time, (3) signal level variation as the distant radar antenna sweeps across the moving target simulator receive antenna. The over-all computer-controlled system of the invention makes it possible for the user to specify target flight profiles (velocity, acceleration, range, pattern-unidirectional, bidirectional "J-hook," etc.) and Doppler off-set. The integration of the moving target simulator into a computer-controlled instrumentation suite also makes it possible to remove frequency drift between the moving target simulator frequency source (which is very stable) and that of the radar by periodically using the system's spectrum analyzer to measure the received radar pulse frequency and to then up-date the system's signal generator frequency. In addition, the user can generate either a constant power target return signal or one which varies as the inverse-4th power of the distance of the simulated targets on the radar under test. Monitoring of the proper functioning of the overall system is enhanced by an LED readout which flashes each time the system's digital attenuation is less than a user-entered threshold value.

In the invention it is possible to further automate this system by replacing manually adjusted thumbreel switches by computer-controlled function. The input off-set control and gain trim could also be computer controlled.

Obviously, many modifications and variations of the invention are possible in the light of the above teachings. It is therefore to be understood that within the scope of the appended claims, the invention may be practiced otherwise than has been specifically described.

What is claimed is:

1. An apparatus for providing a simulated radar return signal to a radar comprising:
receiving means for receiving a radar signal from said radar, said received radar signal being at a radar frequency;
tuning means for tuning to said radar frequency;
amplitude measuring means for measuring the amplitude of said received radar signal;
pulse width measuring means for measuring the pulse width of said received radar signal;
timing means for measuring the time-of-arrival of said received radar return signal;
frequency generator means for generating a simulation signal at said radar frequency and at said measured amplitude and said measured pulse width of said received radar signal;
transmitting means for transmitting said simulation signal to said radar; and
delay means for delaying the transmission of said simulation signal according to a predetermined delay.

2. An apparatus according to claim 1 further including:
control means for altering the frequency of said simulation signal according to the Doppler effect and for altering the signal level of said simulation signal according to a desired formula.

3. An apparatus according to claim 1 in which said pulse width measuring means includes a first pulse generator that generates a first pulse when said radar signal crosses a preselected threshold a first time and that includes a second pulse generator that generates a second pulse when said radar signal crosses said preselected threshold a second time, the overlap of said first and second pulses being said pulse width of said radar signal.

4. An apparatus for providing a simulated radar return signal to a radar comprising:
receiving means for receiving a radar signal from said radar, said received radar signal being at a radar frequency;
tuning means for tuning to said radar frequency;
amplitude measuring means for measuring the amplitude of said received radar signal;
pulse width measuring means for measuring the pulse width of said received radar signal;
timing means for measuring the time-of-arrival of said received radar return signal;
frequency generator means for generating a simulation signal at said radar frequency and at said measured amplitude and said measured pulse width of said received radar signal;
transmitting means for transmitting said simulation signal to said radar;
delay means for delaying the transmission of said simulation signal according to a predetermined delay; and
control means for altering the frequency of said simulation signal according to the Doppler effect and for altering the signal level of said simulation signal according to a desired formula.

5. An apparatus according to claim 4 in which said pulse width measuring means includes a first pulse generator that generates a first pulse when said radar signal crosses a preselected threshold a first time and that includes a second pulse generator that generates a second pulse when said radar signal crosses said preselected threshold a second time, the overlap of said first and second pulses being said pulse width of said radar signal.

6. An apparatus according to claim 5 in which said tuning means includes a spectrum analyzer.

7. An apparatus according to claim 6 in which said amplitude measuring means includes an analog-to-digital converter.

8. An apparatus according to claim 7 in which said frequency generator means includes a signal generator.

9. An apparatus according to claim 8 in which said receiving means includes an antenna and in which said transmitting means includes an antenna.

10. An apparatus according to claim 4 in which said tuning means includes a spectrum analyzer.

11. An apparatus for providing a simulated radar return signal to a radar comprising:
- a receive antenna for receiving a radar signal from said radar, said radar signal being at a radar frequency;
- a spectrum analyzer operably coupled to said receive antenna for tuning to said radar frequency radar signal and for downconverting said radar frequency radar signal to a downconverted frequency radar signal;
- amplitude measuring means operably coupled to said spectrum analyzer for measuring the amplitude of said downconverted frequency radar signal, said amplitude measuring means including an analog-to digital converter;
- pulse width measuring means for measuring the pulse width of said downconverted frequency radar signal, said pulse width measuring means including a first pulse generator that generates a first pulse when said radar signal crosses a preselected threshold a first time and including a second pulse generator that generates a second pulse when said radar signal crosses said preselected threshold a second time, the overlap of said first and second pulses being said pulse width of said radar signal;
- timing means for measuring the time-of-arrival of said received radar return signal;
- frequency generator means including a signal generator for generating a simulation signal at said radar frequency and at said measured amplitude and said measured pulse width of said downconverted radar signal;
- a transmit antenna operably coupled to said frequency generator means for transmitting said simulation signal to said radar;
- delay means for delaying the transmission of said simulation signal according to a predetermined delay;
- computer control means for altering the frequency of said simulation signal according to the Doppler effect and for altering the signal level of said simulation signal according to a predetermined pattern.

* * * * *